United States Patent [19]
Hsiao

[11] Patent Number: 4,625,595
[45] Date of Patent: Dec. 2, 1986

[54] STRUCTURE FOR A WINE STRIPPER

[76] Inventor: Hui W. Hsiao, No. 502, Chung Shan Road, Chung Ho, Taipei, Taiwan

[21] Appl. No.: 741,663

[22] Filed: Jun. 6, 1985

[51] Int. Cl.$^4$ .............................................. H02G 1/12
[52] U.S. Cl. ...................................... 81/9.42; 81/302; 81/321; 81/324
[58] Field of Search ............... 81/9.4, 9.41–9.44, 81/302, 318–324, 339, 427; 30/90.1, 91.1; 72/409–410; 128/321–324

[56] References Cited

U.S. PATENT DOCUMENTS

| | | | |
|---|---|---|---|
| 2,523,936 | 9/1950 | Axelsen | 81/9.42 |
| 2,889,728 | 6/1959 | Hindenburg | 81/9.42 |
| 3,128,652 | 4/1964 | Schinske | 81/9.42 |

*Primary Examiner*—Frederick R. Schmidt
*Assistant Examiner*—Debra S. Meislin
*Attorney, Agent, or Firm*—Armstrong, Nikaido, Marmelstein & Kubovcik

[57] ABSTRACT

A wire stripper comprising a pair of symmetric arms pivotally connected together, a pair of supporting pieces respectively secured to the arms, a stationary cutting member being secured to one of the supporting pieces, a pivotal cutting member pivotally attached thereto cooperating with the stationary cutting member to be served as a stripper, a stationary clamping member being secured to the other supporting piece, a pivotal clamping member pivotally connected thereto associated with the stationary clamping member to be served as a clamp. In use, and electrical wire can be fixedly clamped by the clamp and the coating of the electric wire can be simultaneously stripper off by the stripping. Thus, this invention can complete the stripping action in one single operation.

1 Claim, 7 Drawing Figures

STRUCTURE FOR A WINE STRIPPER

BACKGROUND OF THE INVENTION

This invention relates to an improved structure for a wire stripper.

Figure 6:
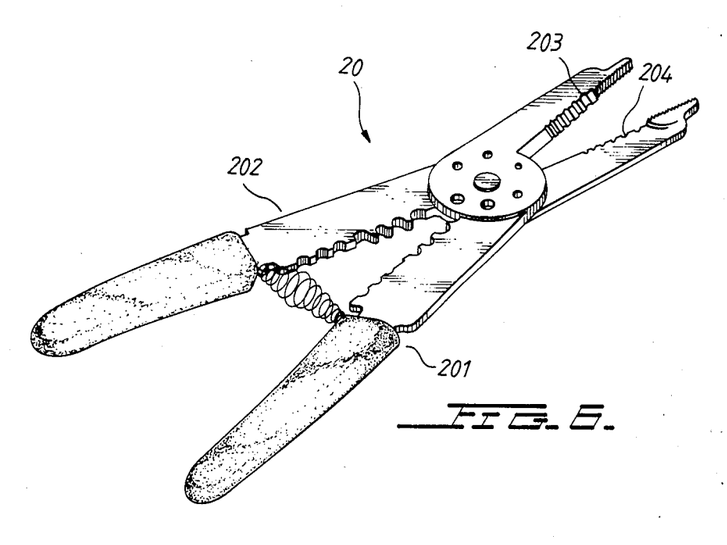
FIG. 6 is a perspective view of the prior art.

Conventional stripper (20), as shown in FIG. 6, consists of a pair of first and second arms (201) (202) which are pivotally connected together. The pair of arms (201) (202) are respectively provided at their corresponding ends with a plurality of semi-circular recesses (203) (204) of different sizes which serve as the stripping members so as to strip the insulation coating off of an electric wire. In use, the electric wire is placed adjacent one of the recesses (203), then the stripper (20) is pressed inwardly to make one of the corresponding recesses (204) approach toward the first recess (203) for fixedly clamping the electric wire therein. Finally, the user holds one end of said electric wire and pulls the stripper (20) in the reverse direction in order to strip the coating off of the electric wire.

However, as described above, the conventional stripper (20) can not strip the coating off in one single operation. Thus, it is not handy enough for the user to implement. Besides, the coating is stripped off the electric wire by force which of course, will result in a bad-looking appearance and possibly damage the metal wire which is surrounded by said coating.

It is, therefore, an object of the present invention to obviate the above-noted drawbacks.

SUMMARY OF THE INVENTION

It is the primary object of the present invention to provide a wire stripper wherein a stationary clamping member associated with a pivotal clamping member can fixedly clamp the electric wire in specified position while a stationary cutting member cooperated with a pivotal cutting member can accurately strip the coating off the electric wire thereon to complete the stripping action in one single operation.

It is another object of the present invention to provide a wire stripper wherein the stationary clamping member is arranged to correspond to the stationary cutting member for making the stripper suitable for the electric wires of different sizes.

It is a further object of the present invention to provide a wire stripper which can provide a nice-looking appearance for the stripped electric wire while not damaging the metal wire received therein.

DETAILED DESCRIPTION OF THE PREFERRED EMBODIMENT

Figure 1:
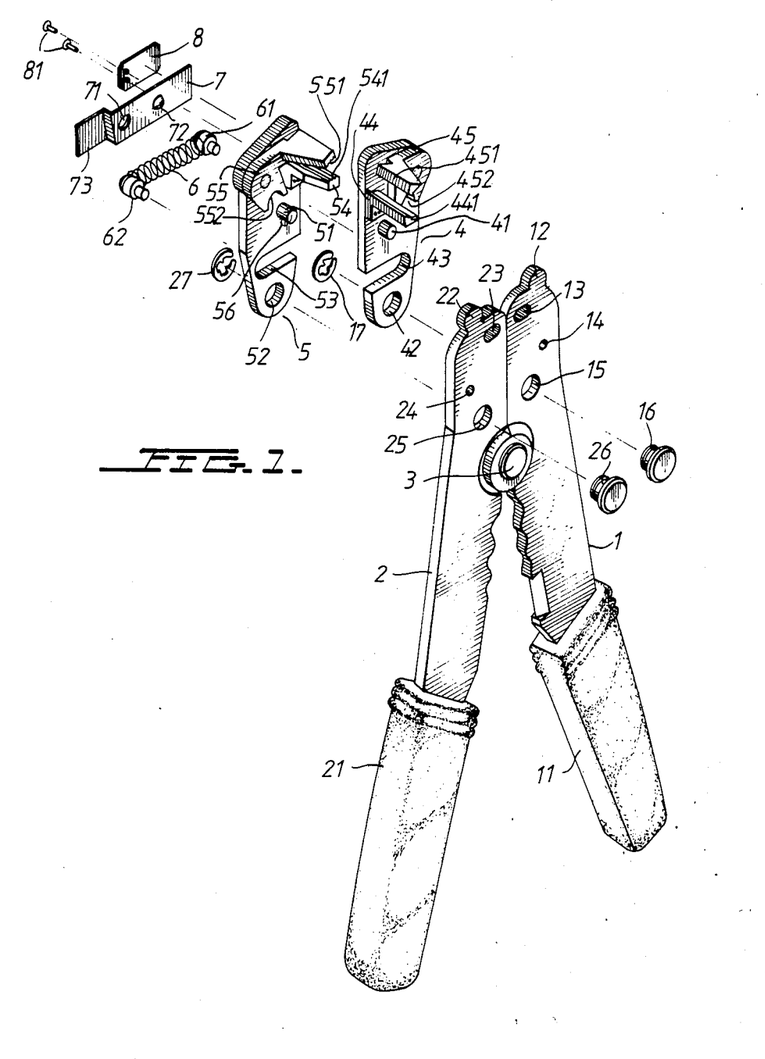
FIG. 1 is a fragmental view of a preferred embodiment of the present invention.
Figure 2:
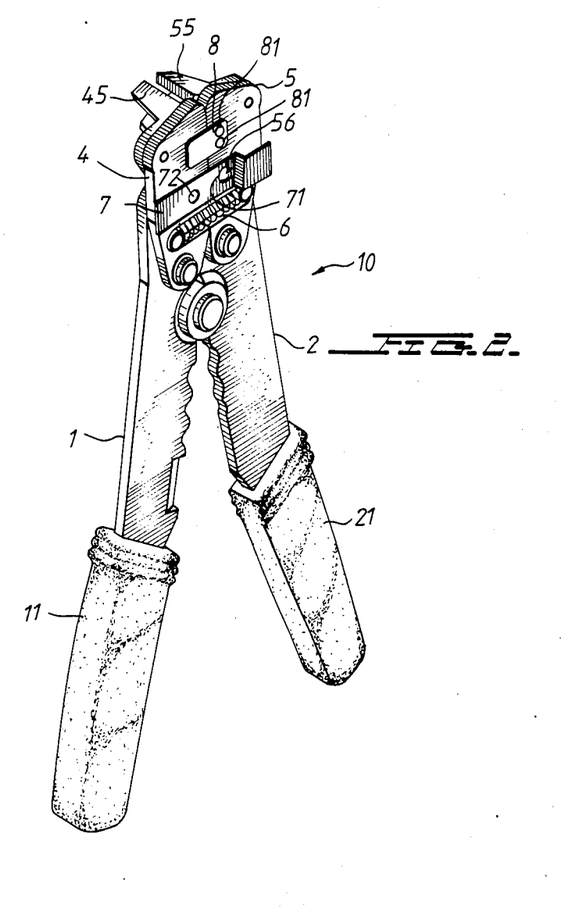
FIG. 2 is a perspective view of FIG. 1.

Referring to the drawings and particularly to FIGS. 1 and 2, an improved stripper (10) comprises a pair of first and second arms (1) (2) which are symmetric to each other and pivotally connected together by means of pivotal means (3) such as hinge. The first arm (1) is provided at one end with a handle (11) and at the other end with a ball member (12), a slot (13), a hole (14) and an aperture (15) while the second arm (2) is furnished at one end with a handle (21) corresponding to the handle (11) and at the other end with a ball member (22), a slot (23), a hole (24) and an aperture (25) which are respectively symmetric to the ball member (12), the slot (13), the hole (14) and the aperture (15). There are a pair of first and second supporting pieces (4) (5) symmetric to each other wherein the first piece (4) is provided at the upper side with a pin (41) corresponding to the slot (13), an aperture (42) corresponding to the aperture (15) and a recess (43) while the second piece (5) is furnished at the upperside with a pin (51) corresponding to the slot (23), an aperture (52) corresponding to the aperture (25) and a recess (53) associated with the recess (43) to form a space for receiving a spring (6) which will be described later. The pair of supporting pieces (4) (5) are respectively secured to the arms (1) (2) by passing the fastening means (16) (26) respectively through the apertures (15) (42) and the apertures (25) (52) and then fixing the fastening means thereon via clamping means (17) (27). At the same time, the pins (41) (51) are respectively inserted through the slots (13) (23) which are so arranged that the pins (41) (51) can be shifted back and forth therein in a predetermined manner.

The spring (6) is received in the recesses (43) and (53) with its both ends respectively attached to the arms (1) (2) by means of a pair of pins (61) (62) which are respectively connected to said ends and in turn are inserted into the holes (14) (24). The first piece (4) is provided at its inner margin with a stationary cutting member (44) having a blade (441) disposed thereon, which cooperates with a pivotal cutting member (45) having a corresponding blade (451) located thereon to serve as the stripping means. The second piece (5) is furnished at its inner margin with a stationary clamping member (54) having a toothed or serrated portion (541) formed thereon, which is associated with a pivotal clamping member (55) having a corresponding toothed or serrated portion (551) formed thereon which serves as a clamping means. It should be noted that the relative positions of the stripping means and the clamping means are arranged that they can be properly applied to the electric wires of different sizes. The pivotal cutting member (45) is provided with a socket (452) which engages with ball member (12) of the first arm 1 to drive the pivotal cutting member (45) by movement of the first arm (1) while the pivotal clamping member (55) is formed with a socket (552) which engages the ball member (22) of the second arm 2 to operate to make the pivotal clamping member (55) by movement of the second arm (2).

Figure 2A:
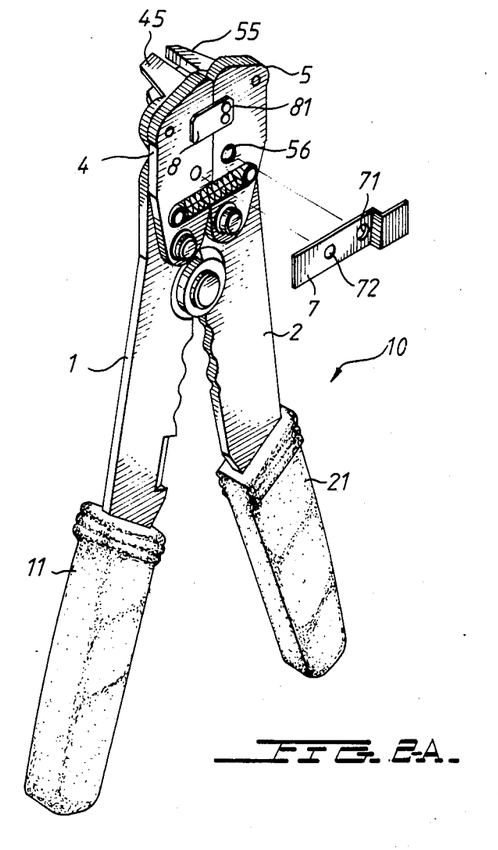
FIG. 2A is a perspective view of FIG. 2 with the latching plate being separated to show the recess and the flange of the first and second supporting pieces.

Referring to FIG. 1 plate (7) is provided with an aperture (71) and a protuberance (72). FIG. 2A shows the underside of the stripped (10) with the latching plate (7) being separated. When the latching plate (7) is secured to the underside of the first piece (4), the protuberance (72) is received within the recess formed in the underside of the first piece (4) to keep the latching piece from pivoting while the aperture (71) is engaged with a protrusion or flange (56) formed in the underside of the second piece (5). This structure holds the stripper (10) in its unused position. Furthermore, the latching plate (7) is provided adjacent to the aperture (71) with a bent portion (73) extending outwardly from the underside of the second piece (5) to a predetermined distance and then being bent to be parallel to the second piece thereof. This arrangement can avoid the interference between the flange (56) and the end of the latching plate (7). A guide or aligning piece (8) is secured to the underside of the second piece (5) adjacent to the latching plate (7) by rivets (81) or other suitable means to keep the first and the second pieces (4) (5) in alignment each other.

Figure 3:
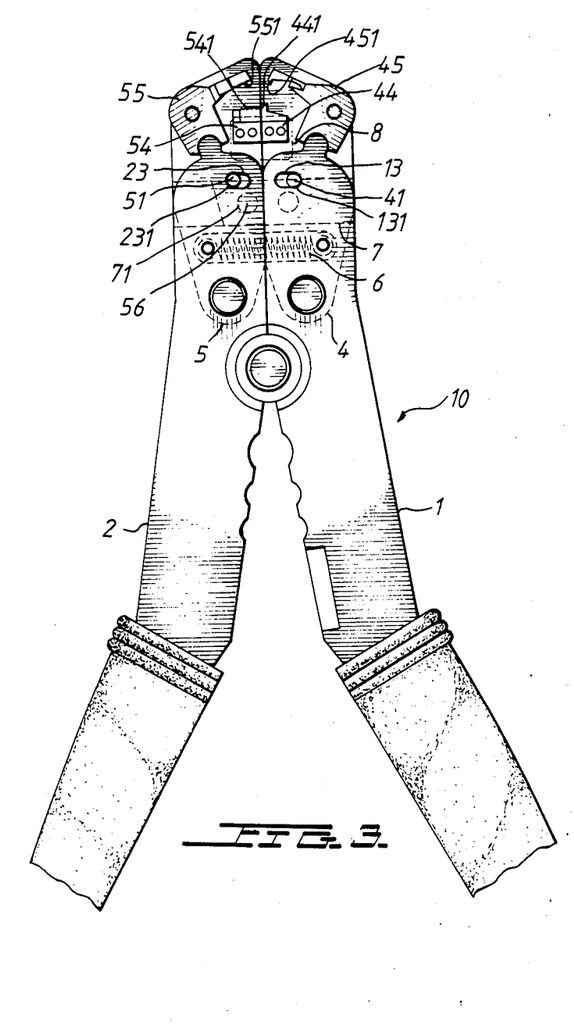
FIG. 3 is a top view of FIG. 2 wherein the stripper is in its unused position.

Referring to FIG. 3, when the stripper is in its unused position, the pins (41) (51) are respectively located at the first ends (131) (231) of the slots (13) (23) to the separate serrated portion (541) from the corresponding serrated portion (551) while separating the blade (441) from the corresponding blade (451). As shown in dot line in FIG. 3, the stripper (10) can be kept in its unused position by means of the spring (6) together with the aperture (71) of the latching plate (7) engaged with the flange (56) of the second piece (5).

Figure 4:
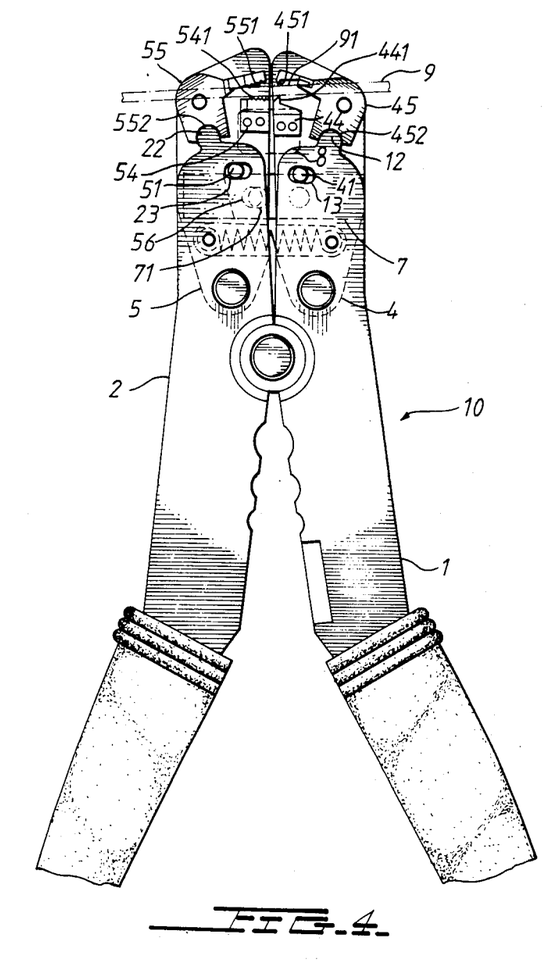
FIG. 4 is a top view of FIG. 2 wherein the stripper is in its initial operating position.

Referring to FIG. 4, firstly, an electric wire (9) is clamped both between the serrated portions (541) and (551) and the blades (441) and (451). Secondly the stripper (10) is pressed inwardly to make the first and second pieces (4) (5) moved outwardly while the pins (41) (51) are respectively shifted to the central positions of the slots (13) (23). Thirdly, owing to the engagement between the ball member (12) and the recess (452), the pivotal cutting member (45) is driven to approach to the stationary cutting member (44) and the coating (91) of the electric wire (9) is contacted with the blades (451) (441). At the same time, because of the engagement between the ball member (22) and the recess (552), the pivotal clamping member (55) is driven to approach to the stationary clamping member (54) and the electric wire (9) is fixedly clamped by the serrated portions (551) (541) thereof, as shown in dot line in FIG. 4. It is noteworthy that the aperture (71) of the fixing plate (7) is partially disengaged from the flange (56) of the second piece (5) so that, at this instant, the aligning piece (8) (FIG. 2) is used to keep the first and second pieces (4) (5) in alignment with each other.

Figure 5:
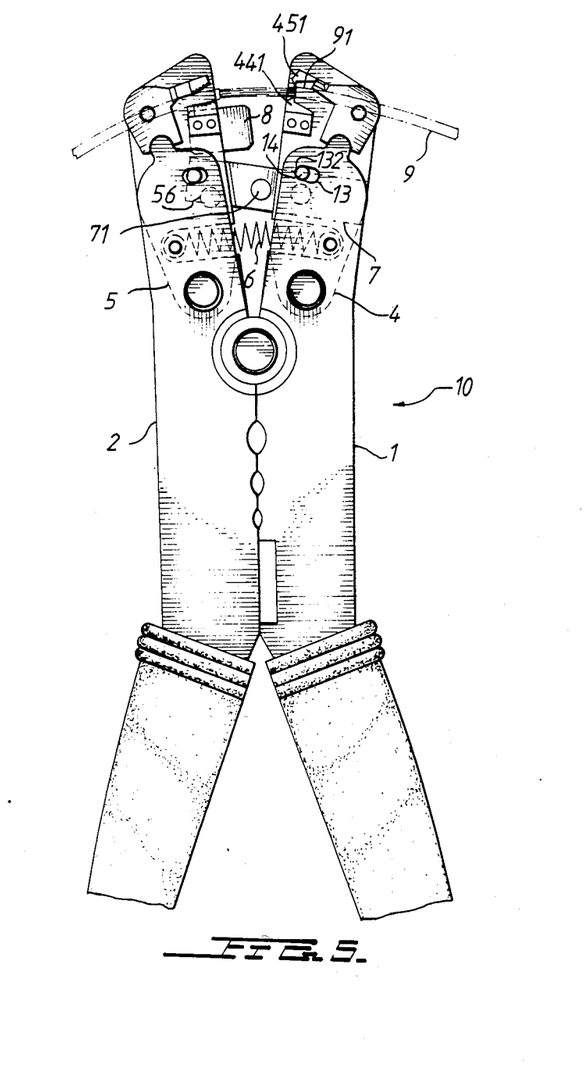
FIG. 5 is a top view of FIG. 2, wherein the stripper is in its final operating position.

Referring to FIG. 5, firstly, the stripper (10) is further pressed inwardly to make the blades (441) (451) thereof bite into the coating (91) of the electric wire (9) to a predetermined depth which is achieved by means of the pin (41) limited by the second end (132) of the slot (13). Secondly, the stripper (10) is further pressed inwardly until the inner margins of the arms (1) (2) contacted each other to strip the coating (91) off of the electric wire (9). Meanwhile, as shown in the dot line of FIG. 5, the aperture (71) of the latching plate (7) is completely disengaged from the flange (56) of the second piece (5). Thirdly, the finished electric wire (9) is automatically removed from the stripper (10) after the stripper (10) returns to its original unused position by means of the spring (6).

I claim:

1. An improved structure for a wire stripper comprising a pair of first and second arms which are symmetric to each other and pivotally connected together, the first arm being provided at one end with a handle and at the other end with a ball member and a slot while the second arm being furnished at one end with a handle corresponding to the handle of the first arm and the other end with a ball member and a slot which are respectively symmetric to a ball member and the slot of the first arm; a pair of first and second pieces symmetric to each other wherein the first piece is provided at an upper side thereof with a pin corresponding to the slot of the first arm and a concave recess formed below said pin, said second piece is furnished at an upper side thereof with a pin corresponding to the slot of the second arm and a concave recess formed below said pin, which is associated with the concave recess of the first piece to form a long slot, a spring received in said long slot and secured at its both ends respectively to the first and second arms, the second piece further provided at an underside thereof with a flange, means for securing the first and the second pieces respectively to the first and the second arms with the pins thereof respectively inserted into the corresponding slots which are so arranged that when the first and second pieces are driven to an operating position by pressing the two arms inwardly, the pins will respectively move along the corresponding slots to central portions of the slots, and when the first and second pieces are driven back to an unused position by the spring, the pins will move along the corresponding slots to outer portions thereof; a stationary cutting member being secured to the upper side of the first piece, a pivotal cutting member pivotally connected to the upper side of the first piece cooperating with said stationary cutting member to be a stripping means, said pivotal cutting member being provided with a socket engaging with the ball member of the first arm such that the pivotal cutting member is driven by the first arm thereof; a stationary clamping member being secured to the upper side of the second piece, a pivotal clamping member pivotally connected to the upper side of the second piece cooperating with said stationary clamping member to be a clamping means, said pivotal clamping member being furnished with a socket engaging with the ball member of the second arm such that the pivotal clamping member is driven by the second arm thereof; a latching plate being provided with a protuberance corresponding to the concave recess of the first piece and an aperture corresponding to the flange of the second piece, the latching plate being secured to the underside of the first piece with its protuberance received in said concave recess and with its aperture engaged with the flange to keep the stripper in its unused position; the latching plate further provided at an end adjacent to the aperture with a bent portion extending outwardly from the underside of the second piece to a predetermined distance and then being bent to be parallel to said second piece so as to avoid the interference between the flange of the second piece and the end of the latching plate; an aligning piece being secured to the underside of the second piece adjacent to said latching plate to keep the first and the second pieces in alignment each other.

* * * * *

UNITED STATES PATENT AND TRADEMARK OFFICE
CERTIFICATE OF CORRECTION

PATENT NO. : 4,625,595

DATED : December 2, 1986

INVENTOR(S) : HUI W. HSIAO

It is certified that error appears in the above-identified patent and that said Letters Patent is hereby corrected as shown below:

On the cover page, Item [54], change "WINE" to

--- WIRE ---.

Signed and Sealed this

Twenty-first Day of April, 1987

Attest:

DONALD J. QUIGG

*Attesting Officer*    *Commissioner of Patents and Trademarks*